(12) United States Patent
Nagatomi et al.

(10) Patent No.: US 7,801,011 B2
(45) Date of Patent: Sep. 21, 2010

(54) OPTICAL PICKUP DEVICE AND OPTICAL DISK APPARATUS

(75) Inventors: Kenji Nagatomi, Kaidu (JP); Yasuyuki Kano, Hashima (JP)

(73) Assignees: Sanyo Electric Co., Ltd., Osaka (JP); Tokyo Optec Design Co., Ltd., Tokyo (JP)

( * ) Notice: Subject to any disclaimer, the term of this patent is extended or adjusted under 35 U.S.C. 154(b) by 420 days.

(21) Appl. No.: 12/024,278

(22) Filed: Feb. 1, 2008

(65) Prior Publication Data

US 2008/0186833 A1 Aug. 7, 2008

(30) Foreign Application Priority Data

Feb. 1, 2007 (JP) ............................. 2007-022867

(51) Int. Cl.
   *G11B 7/00* (2006.01)
(52) U.S. Cl. .............................. 369/112.23; 369/112.16
(58) Field of Classification Search ........................ None
   See application file for complete search history.

(56) References Cited

U.S. PATENT DOCUMENTS

| | | | |
|---|---|---|---|
| 6,044,048 A | * | 3/2000 | Oinoue et al. ............. 369/44.23 |
| 7,668,066 B2 | * | 2/2010 | Atarashi et al. ......... 369/112.24 |
| 2006/0007812 A1 | * | 1/2006 | Nishi et al. .............. 369/44.37 |
| 2006/0018214 A1 | * | 1/2006 | Fujii et al. ............... 369/44.37 |
| 2006/0164954 A1 | * | 7/2006 | Hashimura ............. 369/112.01 |
| 2008/0031099 A1 | * | 2/2008 | Tezuka .................... 369/44.14 |
| 2008/0175129 A1 | * | 7/2008 | Tanaka et al. .......... 369/112.23 |

FOREIGN PATENT DOCUMENTS

JP    11-120606    4/1999

* cited by examiner

*Primary Examiner*—Van N Chow
(74) *Attorney, Agent, or Firm*—Ditthavong, Mori & Steiner, P.C.

(57) ABSTRACT

A half-wave plate is attached to a lens holder to integrally drive a collimator lens and the half-wave plate. When the lens holder is moved to a servo position, the half-wave plate is inserted in and retracted from an optical path of a laser beam. Therefore, the laser beam is formed in S-polarized light or P-polarized light with respect to a polarization beam splitter, and the laser beam is guided to a first objective lens or a second objective lens.

8 Claims, 11 Drawing Sheets

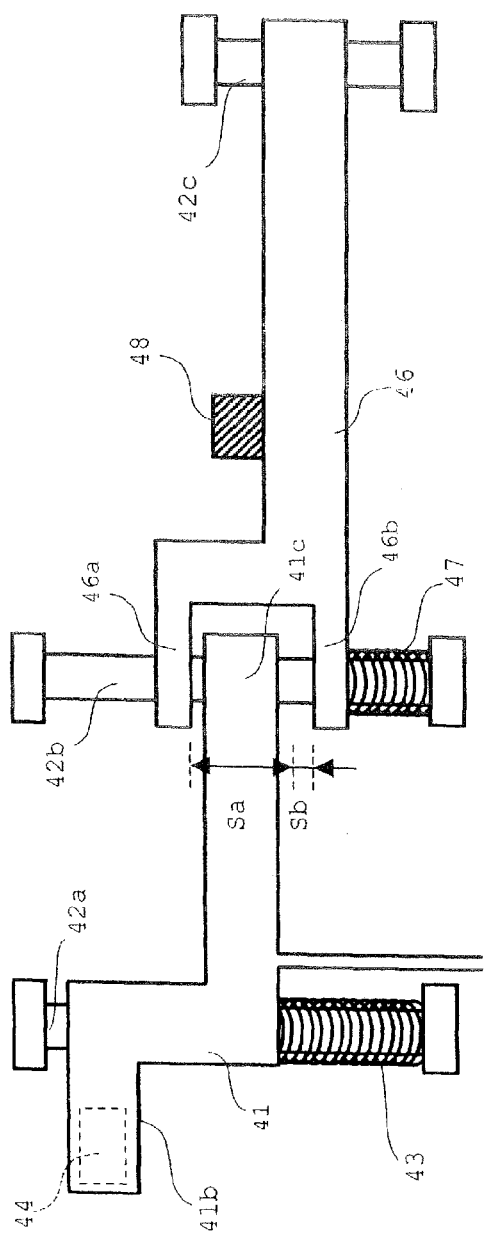

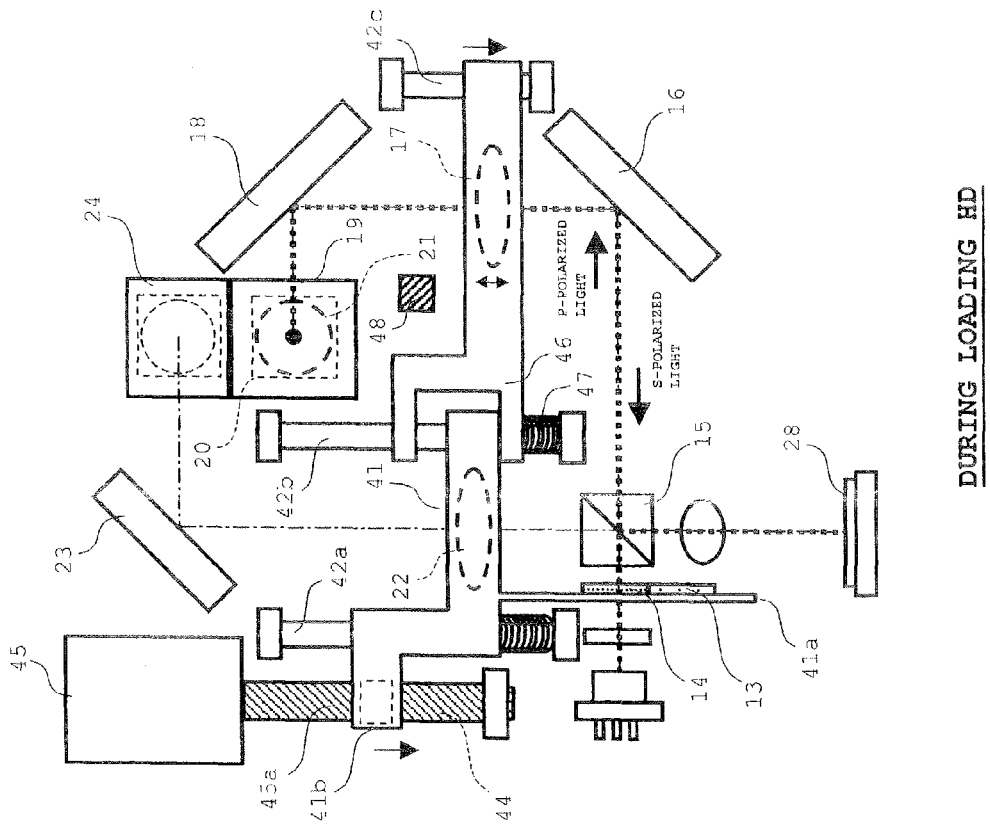
FIG. 5A  DURING LOADING BD
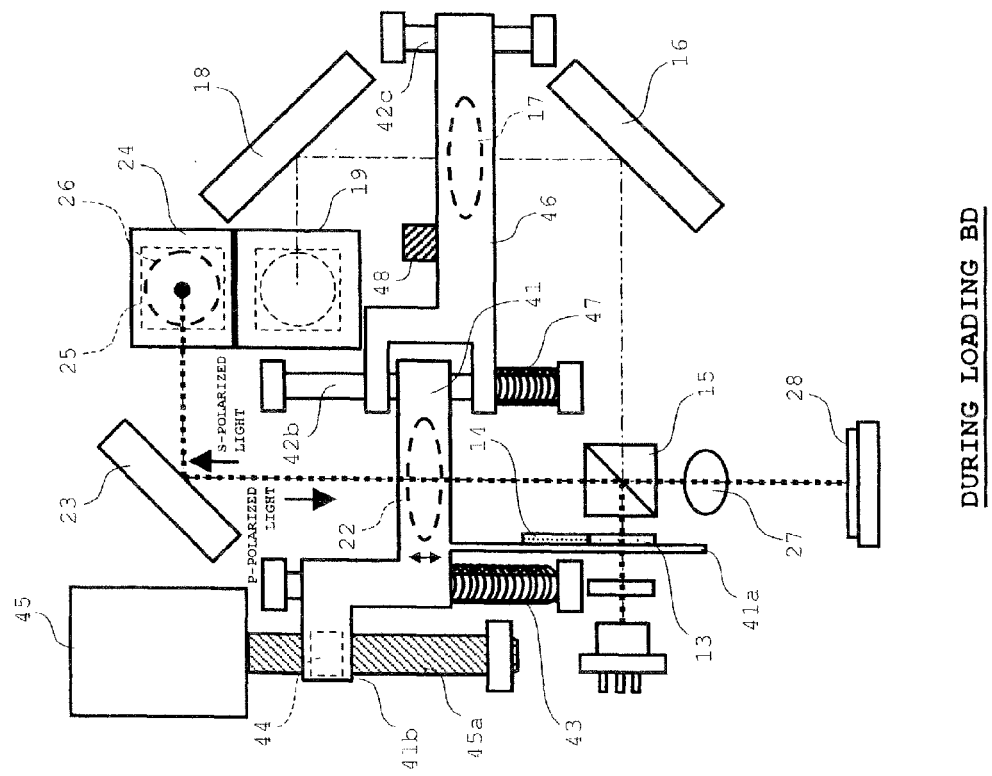
FIG. 5B  DURING LOADING HD

DURING LOADING HD

DURING LOADING BD

DURING LOADING BD

DURING LOADING HD

OPTICAL PICKUP DEVICE AND OPTICAL DISK APPARATUS

This application claims priority under 35 U.S.C. Section 119 of Japanese Patent Application No. 2007-022867 filed Feb. 1, 2007, entitled "OPTICAL PICKUP DEVICE AND OPTICAL DISK APPARATUS".

BACKGROUND OF THE INVENTION

1. Field of the Invention

The present invention relates to an optical pickup device and an optical disk apparatus into which the optical pickup device is incorporated, particularly to a compatible type optical pickup device sorting a laser beam emitted from a common light source into two objective lenses and an optical disk apparatus into which the optical pickup device is incorporated.

2. Description of the Related Art

Currently, there are two optical disks, i.e., BD (Blu-ray Disc) and HDDVD (High-Definition Digital Versatile Disc), in which a laser beam having a blue wavelength is used. Because BD and HDDVD differ from each other in a thickness of a cover layer, two objective lenses compatible with BD and HDDVD are provided in the optical pickup device compatible with both BD and HDDVD, and the laser beam having the blue wavelength emitted from one semiconductor laser is sorted into the objective lenses by an optical system respectively.

A liquid crystal cell and a polarization beam splitter can be used as a configuration in which the laser beam is sorted into the two objective lenses. In the configuration, a polarization direction of the laser beam is changed into one of P-polarized light and S-polarized light with respect to the polarization beam splitter by the liquid crystal cell. In the case of P-polarized light, the laser beam is transmitted through the polarization beam splitter and guided to a first objective lens. In the case of the S-polarized light, the laser beam is reflected by the polarization beam splitter and guided to the first objective lens.

However, in the configuration, cost of the optical pickup device is increased because the liquid crystal cell is used as a function for sorting the laser beam into the two objective lenses. Unfortunately, a problem arises that the laser beam strength is attenuated when the laser beam passes through the liquid crystal cell. Additionally, it is necessary that circuits and configurations for controlling drive of the liquid crystal cell be separately provided to guide the laser beam to which objective lens.

SUMMARY OF THE INVENTION

According to a first aspect of the present invention, an optical pickup device includes a laser source which emits a laser beam having a predetermined wavelength; first and second objective lenses which cause the laser beam to converge onto a recording medium; a polarization beam splitter which is disposed between the laser source and the first and second objective lenses; first and second optical systems which guide the two laser beams split by the polarization beam splitter to the first and second objective lenses respectively; first and second optical elements which are disposed in the first and second optical systems respectively, the first and second optical elements being moved in optical axis directions of the laser beams to adjust optical characteristics of the laser beams respectively; a first actuator which supports a first holder holding the first optical element while the first holder can be displaced in the optical axis direction of the laser beam; a second actuator which supports a second holder holding the second optical element while the second holder can be displaced in the optical axis direction of the laser beam; a driving portion which imparts a driving force to the first actuator; a transfer mechanism which transfers the driving force to the second actuator such that a drive stroke is smaller than that of the first actuator; and a wave plate which is inserted in and retracted from an optical path between the laser source and the polarization beam splitter to change the polarization direction of the laser beam when the laser beam is incident to the polarization beam splitter.

The first and second optical elements are moved in a direction in which the wave plate is inserted and retracted, the wave plate is disposed in a support portion integral with the first holder, the first actuator moves the first holder in both a first stroke for optical characteristic adjustment with the first optical element and a second stroke exceeding the first stroke.

The first holder is moved between the stroke for optical characteristic adjustment and the additional stroke to insert and retract the wave plate in and from the optical path. The polarization direction of the laser beam incident to the polarization beam splitter is adjusted such that the laser beam is guided to the first optical system, when the first holder is located in the first stroke, and the second holder is located in the stroke for optical characteristic adjustment with the second optical element while the polarization direction of the laser beam incident to the polarization beam splitter is adjusted such that the laser beam is guided to the second optical system, when the first holder is located in the second stroke.

In the optical pickup device according to the first aspect of the present invention, the wave plate is inserted in and retracted from the optical path using the first actuator driving the first optical element, and the target to which the laser beam is incident is switched between the first and second objective lenses. Therefore, the need for the additional configuration for driving the wave plate is eliminated to achieve the simple configuration of the optical pickup device. Because the inexpensive wave plate is used as the optical path switching part, the cost increase can be suppressed in the optical pickup device.

Additionally, the optical path of the second optical system can be shortened because the drive stroke of the second actuator is suppressed by stroke buffering action in the transmission mechanism. Therefore, even if the large optical path of the second optical system is not ensured due to layout of the optical components, the second optical element can smoothly be driven by the common driving portion.

According to a second aspect of the present invention, the optical disk apparatus includes the optical pickup device according to the first aspect of the present invention; and a servo circuit which controls the driving portion to adjust the optical characteristics of the laser beams incident to the first and second objective lenses, the servo circuit controlling whether the laser beam is guided to the first or second optical system.

BRIEF DESCRIPTION OF THE DRAWINGS

The above and further objects and novel features of the present invention will more fully appear from the following description of embodiments with reference to the accompanying drawings, in which:

FIGS. 2A and 2B are views explaining a drive stroke of a lens holder of the embodiment;

FIGS. 5A and 5B are views explaining an operation of the optical pickup device of the embodiment;

However, the drawings are illustrated only by way of example without limiting the scope of the present invention.

DESCRIPTION OF THE PREFERRED EMBODIMENTS

Preferred embodiments of the present invention will be described below with reference to the drawings. In the following embodiments, the present invention is applied to an optical pickup device and an optical disk apparatus compatible with Blu-ray Disc (hereinafter referred to as "BD") and HDDVD (hereinafter referred to as "HD").

Figure 1A:
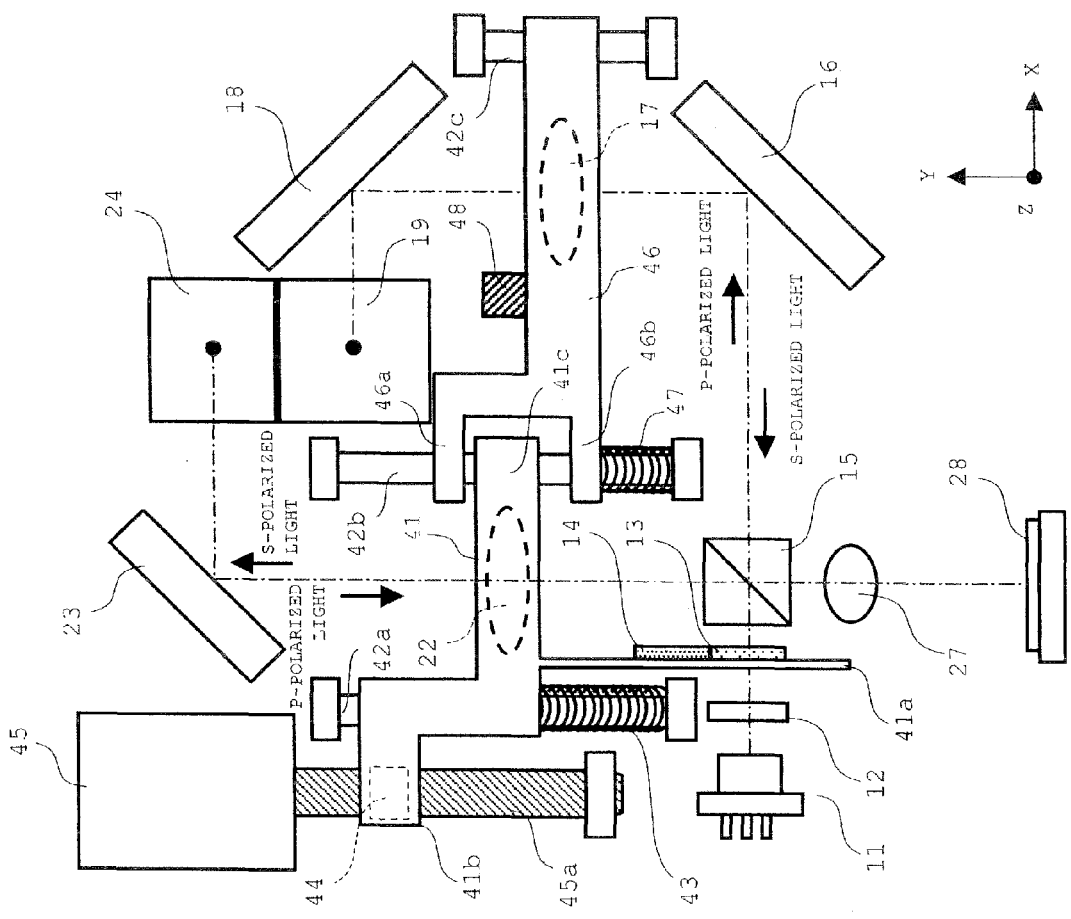
FIGS. 1A and 1B show a configuration of an optical pickup device according to an embodiment of the present invention.
Figure 1B:
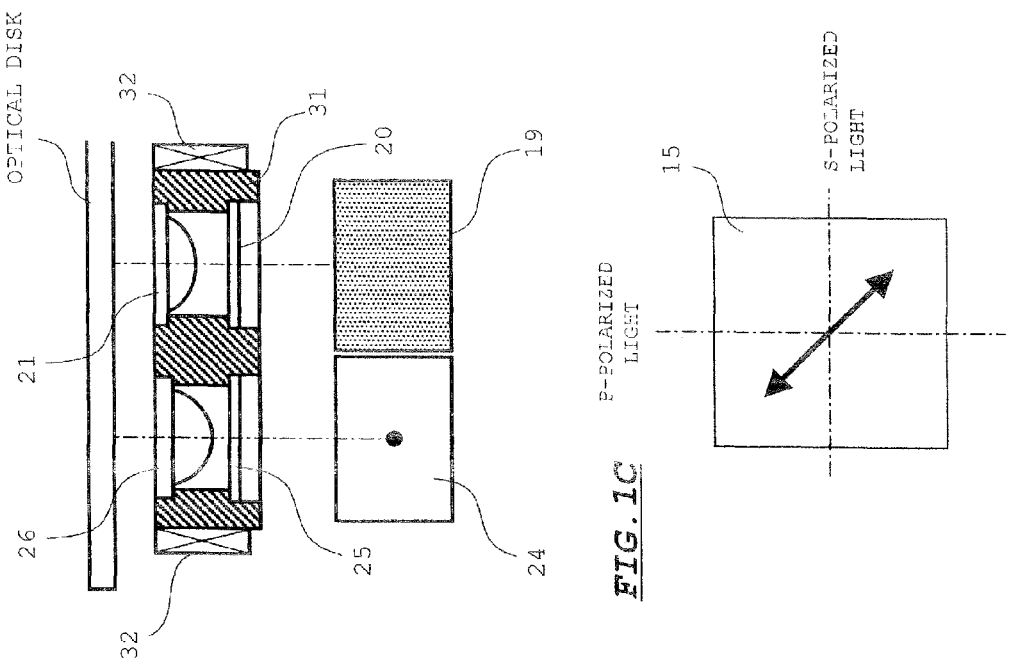
Figure 1C:
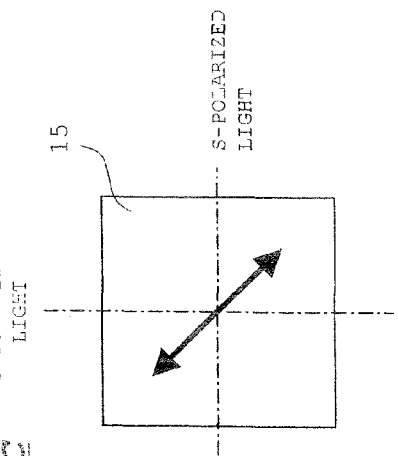
FIG. 1C shows a polarization direction of a laser beam.

An optical pickup device according to an embodiment of the present invention will be described with reference to FIGS. 1A to 1C. FIG. 1A is a plan view showing an optical system of the optical pickup device, and FIG. 1B is a side view showing a portion subsequent to upwardly reflecting mirrors 19 and 24 of FIG. 1A when viewed from an X-axis direction. In FIG. 1B, an objective lens holder 31 is shown by a sectional view such that an internal structure of the objective lens holder 31 can easily be seen.

With reference to FIGS. 1A and 1B, a semiconductor laser 11 emits a laser beam having a wavelength of about 400 nm. A half-wave plate 12 is provided to adjust a polarization direction of the laser beam with respect to a polarization beam splitter 15. For example, the half-wave plate 12 is provided such that the polarization direction of the laser beam becomes the direction of 45' (arrow direction of FIG. 1C) with respect to the polarization beam splitter 15 for the P-polarized light and S-polarized light.

A half-wave plate 13 converts the polarization direction of the laser beam into the S-polarized light with respect to the polarization beam splitter 15 after the laser beam passes through the half-wave plate 12. A half-wave plate 14 converts the polarization direction of the laser beam into the P-polarized light with respect to the polarization beam splitter 15 after the laser beam passes through the half-wave plate 12. The half-wave plates 13 and 14 are disposed in a tongue piece 41a of a lens holder 41 holding a collimator lens 22. In the tongue piece 41a, openings or notches are formed in positions where the half-wave plates 13 and 14 are disposed such that the laser beam passing through the half-wave plate 12 is guided toward the direction of the polarization beam splitter 15.

The polarization beam splitter 15 transmits or reflects the laser beam incident from the side of the semiconductor laser 11 according to the polarization direction of the laser beam. As shown in FIG. 1A, in the case where the laser beam is transmitted through the half-wave plate 13, the laser beam becomes the S-polarized light and is reflected by the polarization beam splitter 15. On the other hand, when the lens holder 41 is displaced from the state shown in FIG. 1A toward a Y-axis direction to cause the half-wave plate 14 to transmit the laser beam, the laser beam becomes the P-polarized light and the laser beam is transmitted through the polarization beam splitter 15.

After the laser beam (P-polarized light) transmitted through the half-wave plate 14 is transmitted through the polarization beam splitter 15, the laser beam is reflected by a mirror 16, and the laser beam is converted into parallel light by a collimator lens 17. Then, the laser beam is reflected by a mirror 18 and the laser beam is reflected toward a direction of an HD objective lens 21 by the upwardly reflecting mirror 19.

A quarter-wave plate 20 converts the light reflected from the optical disk into linearly-polarized light (S-polarized light) while converting the laser beam reflected by the upwardly reflecting mirror 19 into circularly-polarized light. The linearly polarized light is orthogonal to polarization direction in which the laser beam is incident to the optical disk. Therefore, the laser beam reflected from the optical disk is reflected by the polarization beam splitter 15 and introduced to a photodetector 28. The HD objective lens 21 causes the laser beam incident from the side of the quarter-wave plate 20 to converge onto HD.

The laser beam (S-polarized light) transmitted through the half-wave plate 13 is reflected by the polarization beam splitter 15, and the laser beam is converted into the parallel light by the collimator lens 22. Then, the laser beam is reflected by a mirror 23, and the laser beam is further reflected toward a direction of a BD objective lens 26 by the upwardly reflecting mirror 24.

A quarter-wave plate 25 converts the light reflected from the optical disk into the linearly-polarized light (S-polarized light) while converting the laser beam reflected by the upwardly reflecting mirror 24 into the circularly-polarized light. The linearly polarized light is orthogonal to polarization direction in which the laser beam is incident to the optical disk. Therefore, the laser beam reflected from the optical disk is transmitted through the polarization beam splitter 15 and introduced to the photodetector 28. The BD objective lens 26 causes the laser beam incident from the side of the quarter-wave plate 25 to converge onto BD.

An anamorphic lens 27 induces astigmatism into the laser beam reflected from the optical disk. The photodetector 28 includes a quadratic sensor in a light acceptance surface thereof, and the photodetector 28 is disposed such that an optical axis of the laser beam reflected from the optical disk pierces through an intersection point of two parting lines of the quadratic sensor. A focus error signal, a tracking error signal, and a reproduction signal are generated based on signals from the quadratic sensor.

As shown in FIG. 1B, the quarter-wave plates 20 and 25, the HD objective lens 21, and the BD objective lens 26 are attached to the common objective lens holder 31. The objective lens holder 31 is driven in a focus direction and in a tracking direction by a well-known objective lens actuator including a magnetic circuit and a coil. Usually the coil is disposed in the objective lens holder 31. In the objective lens actuator of FIG. 1B, only the coil 31 is shown and the magnetic circuit is not shown.

In the two collimator lenses, the BD collimator lens 22 is attached to a lens holder 41. The lens holder 41 is supported by guide shafts 42a and 42b provided in parallel on the support base, and the lens holder 41 can be moved in an optical axis direction of the collimator lens 22. The plate-shape tongue piece 41a having a predetermined width in a Z-axis direction of FIG. 1A is formed in the lens holder 41, and the half-wave plates 13 and 14 are attached onto one of the surfaces of the tongue piece 41a as described above.

A plate-shape portion 41b which is elastically bent in the Z-axis direction of FIG. 1A is formed in the lens holder 41, and a rack gear 44 is provided in a lower surface of the plate-shape portion 41b. On the other hand, a motor 45 is placed on the support base, and a worm gear 45a is formed in a rotary shaft of the motor 45. The motor 45 is formed by a stepping motor. The rack gear 44 provided in the lower surface of the plate-shape portion 41b of the lens holder 41 is brought into press-contact with the rotary shaft of the motor 45 so as to engage the worm gear 45a. Therefore, when the motor 45 is driven, a driving force of the motor 45 is transmitted to the lens holder 41 through the worm gear 45a and rack gear 44. This enables the lens holder 41 to be moved in the optical axis direction of the collimator lens 22.

A guide shaft 42a is inserted into a spring 43, and the lens holder 41 is biased toward the direction of the motor 45 by the spring 43. The biasing force eliminates mechanical play of the motor shaft in a longitudinal direction.

The HD collimator lens 17 is attached to a lens holder 46. The lens holder 46 is supported by guide shafts 42b and 42c provided in parallel on the support base, and the lens holder 46 can be moved in the optical axis direction of the collimator lens 17. Accordingly, the guide shaft 42b supports both the lens holder 41 and the lens holder 46. Two supported portions (hereinafter referred to as "second supported portion 46a and 46b") on the side of the lens holder 46 are provided so as to sandwich a supported portion (hereinafter referred to as "first supported portion 41c") on the side of the lens holder 41 in the Y-axis direction of FIG. 1A. Predetermined gaps exist between the first supported portion 41c and the second supported portions 46a and 46b.

A guide shaft 42b is inserted into a spring 47, and the biasing force of the spring 47 brings the lens holder 46 into press-contact with a stopper 48 on the support.

FIGS. 2A and 2B are views explaining drive strokes of the lens holders 41 and 46.

With reference to FIG. 2A, the lens holder 41 is driven in a range of a stroke Sa during an aberration correction operation when BD is loaded in the optical disk apparatus. In this case, the first supported portion 41c does not abut on the second supported portions 46a and 46b, but the first supported portion 41c is moved between the second supported portions 46a and 46b. In addition to the stroke Sa, a stroke Sb remains between the first supported portion 41c and the second supported portions 46a and 46b.

When HD is loaded, the lens holder 41 is moved from the state shown in FIG. 2A across the stroke Sb to the lower portion of FIG. 2A. At this point, the first supported portion 41c abuts on the second supported portion 46b in the middle of the movement, and the lens holder 41 is further moved to the lower portion of FIG. 2A, whereby the lens holder 46 is moved to the position shown in FIG. 2B against the biasing force of the spring 47. Therefore, the lens holder 46 is located at a position where aberration correction is performed by the collimator lens 17. The lens holder 46 is displaced in a range of a stroke Sc during the aberration correction operation.

Figure 3:
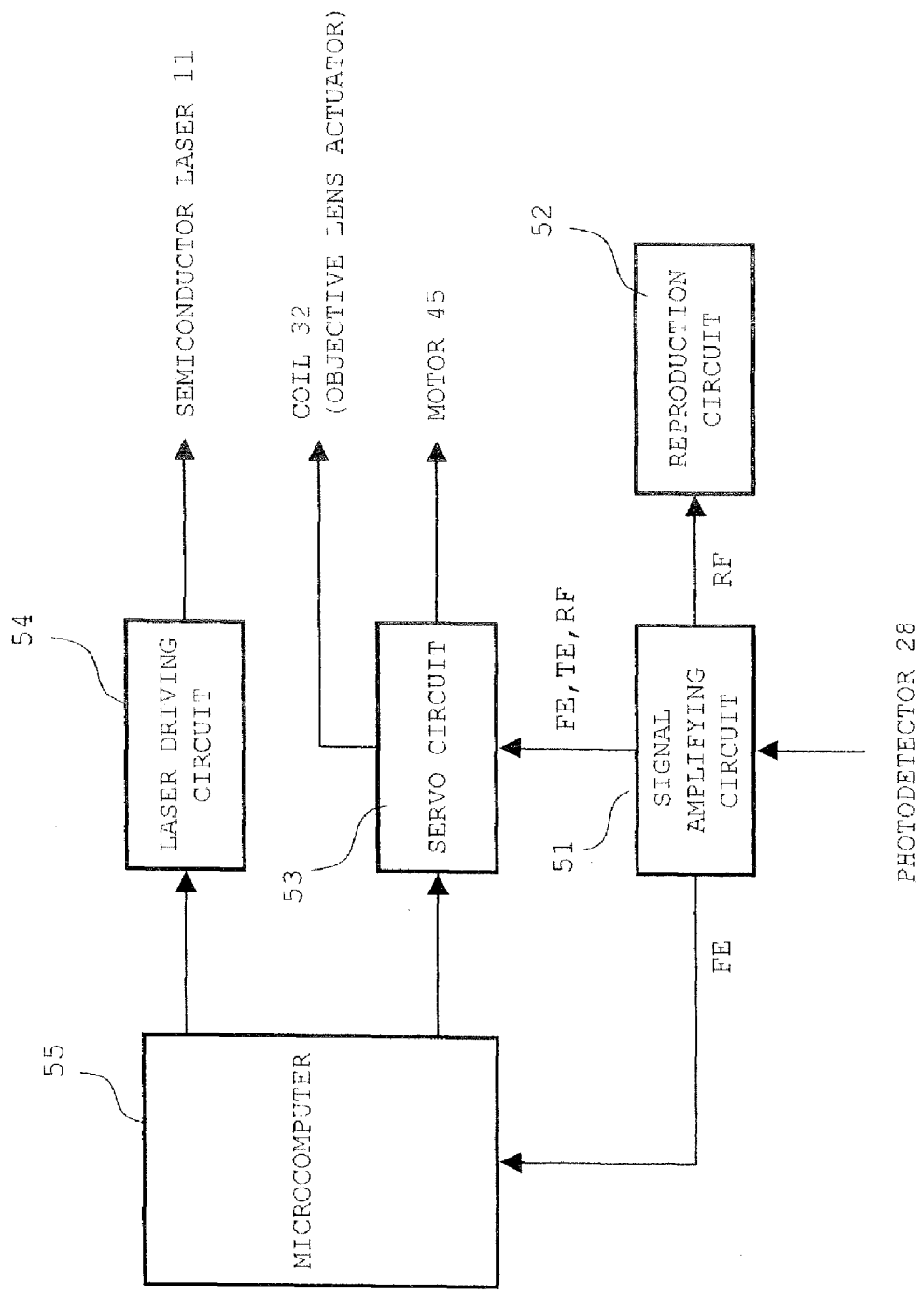
FIG. 3 shows a circuit configuration of an optical disk apparatus according to an embodiment of the present invention.

FIG. 3 shows a circuit configuration of an optical disk apparatus according to an embodiment of the present invention, into which the optical pickup device is incorporated. FIG. 3 shows only portions concerning the optical pickup device in the circuit configuration of the optical disk apparatus.

Figure 4:
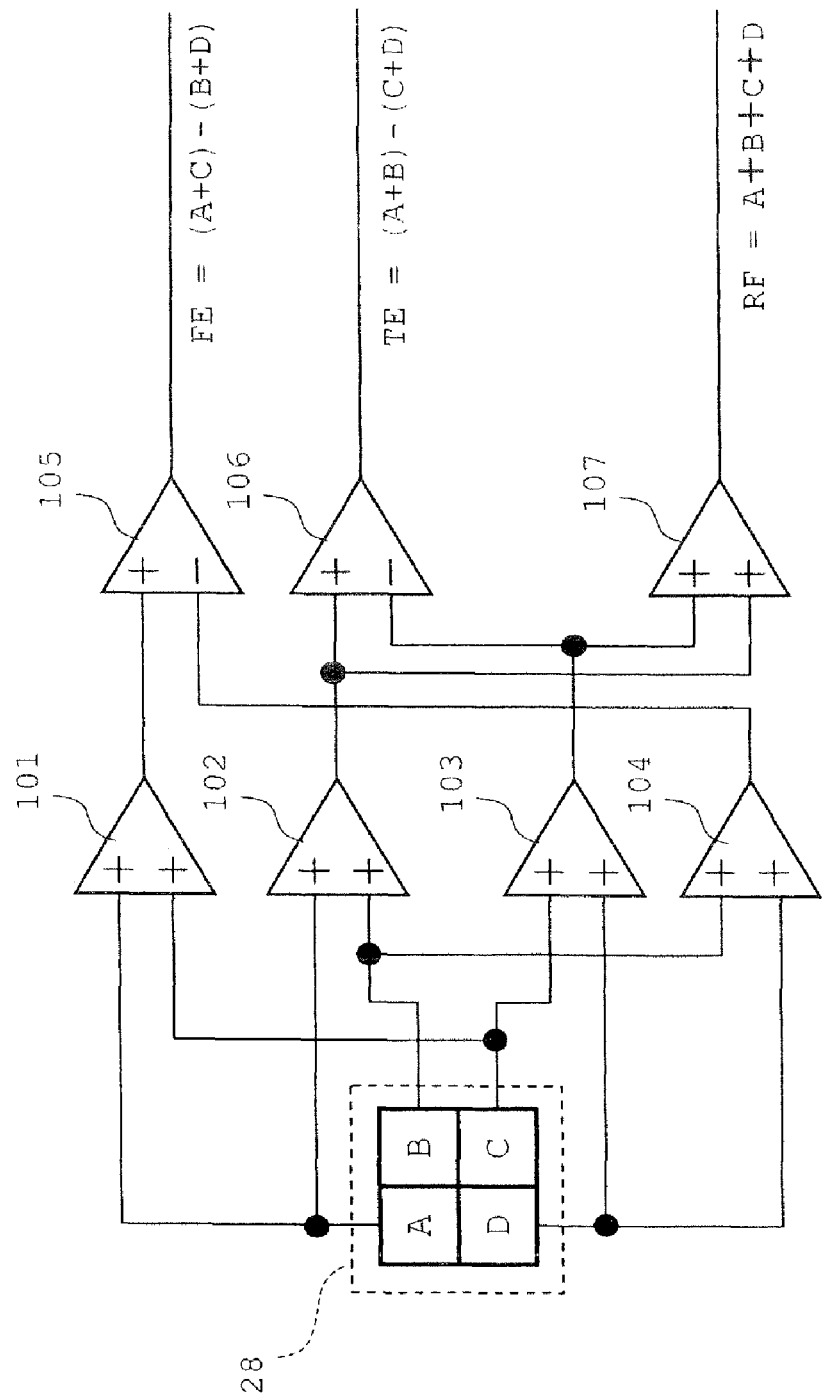
FIG. 4 shows a configuration of a signal amplifying circuit of the embodiment.

A signal amplifying circuit 51 generates a focus error signal (FE), a tracking error signal (TE), and a reproduction signal (RF) based on the signal inputted from the photodetector 28. FIG. 4 shows a configuration of the signal amplifying circuit 51. As show in FIG. 4, the signal amplifying circuit 51 includes five adding circuits 101 to 104 and 107 and two subtracting circuits 105 and 106. As described above, the quadratic sensor is disposed in the photodetector 28, Assuming that A to D are signals from the sensors A to D shown in FIG. 4, the focus error signal (FE), the tracking error signal (TE), and the reproduction signal (RF) are generated by computations of FE=(A+C)−(B+D), TE=(A+B)−(C+D) and RF=A+B+C+D respectively.

With reference again to FIG. 3, a reproduction circuit 52 reproduces data by processing the reproduction signal (RF) inputted from the signal amplifying circuit 51.

A servo circuit 53 generates a focus servo signal and a tracking servo signal based on the focus error signal (FE) and tracking error signal (TE) inputted from the signal amplifying circuit 51, and the servo circuit 53 supplies the focus error signal (FE) and the tracking error signal (TE) to the coil 32 (objective lens actuator) in the optical pickup device. In reproducing BD and HD, the servo circuit 53 monitors the reproduction signal (RF) inputted from the signal amplifying circuit 51, the servo circuit 53 generates a servo signal (aberration servo signal) to drive and control the collimator lenses 22 and 17 such that the reproduction signal (RF) becomes the best, and the servo circuit 53 supplies the servo signal to the motor 45 in the optical pickup device.

The servo circuit 53 supplies a signal to the motor 45 to locate the lens holder 41 at one of a first position and a second position according to a control signal inputted from a microcomputer 55. At the first position, the half-wave plate 13 is inserted in an optical path between the half-wave plate 12 and the polarization beam splitter 15. At the second position, the half-wave plate 14 is inserted in the optical path between the half-wave plate 12 and the polarization beam splitter 15. Additionally, the servo circuit 53 supplies a signal for focus pull-in to the coil 32 (objective lens actuator) in the optical pickup device.

A laser driving circuit 54 drives the semiconductor laser 11 in the optical pickup device according to the control signal inputted from the microcomputer 55. The microcomputer 55 controls each portion according to a program stored in a built-in memory.

An operation of the optical pickup device will be described with reference to FIGS. 5A and 5B.

With reference to FIG. 5A, when BD is loaded in the optical disk apparatus, the lens holder 41 is located at the first position, and the half-wave plate 13 is inserted in the optical path between the half-wave plate 12 and the polarization beam splitter 15. At this point, the collimator lens 22 is located at an initial position (predetermined position for forming the laser beam in the parallel light) in the stroke Sa of FIG. 2A. When the half-wave plate 13 is inserted in the optical path, the laser beam is transmitted through the half-wave plate 13 to become the S-polarized light with respect to the polarization beam splitter 15. Therefore, the laser beam substantially totally reflected by the polarization beam splitter 15.

After the laser beam reflected by the polarization beam splitter 15 is formed in the parallel light by the collimator lens 22, the laser beam is reflected by the mirror 23, and the laser beam is further reflected toward the BD objective lens 26 by the upwardly reflecting mirror 26. Then, the laser beam is converted into the circularly-polarized light by the quarter-wave plate 25, and the laser beam is caused to converge onto BD by the objective lens 26.

The laser beam reflected from BD is transmitted through the quarter-wave plate 25 again, thereby converting the laser beam into the linearly-polarized light orthogonal to the polarization direction in which the laser beam is incident to the optical disk. Then, the laser beam reversely travels the optical path, and is incident to the polarization beam splitter 15. At this point, the laser beam is substantially totally transmitted through the polarization beam splitter 15 because the polarization direction of the laser beam becomes the P-polarized light with respect to the polarization beam splitter 15. Then, the anamorphic lens 27 induces the astigmatism into the laser beam, and the laser beam converges onto the light acceptance surface (quadratic sensor) of the photodetector 28.

In performing the reproduction operation to BD, the aberration servo signal is supplied to the motor 45, the collimator lens 22 is finely moved in the optical axis direction in the aberration correction stroke range (stroke Sa of FIG. 2A) range, which suppresses the aberration generated in the laser beam on BD.

With reference to FIG. 5B, when HD is loaded in the optical disk apparatus, the lens holder 41 is located at the second position, and the half-wave plate 14 is inserted in the optical path between the half-wave plate 12 and the polarization beam splitter 15. At this point, the collimator lens 17 is located at an initial position (predetermined position for forming the laser beam in the parallel light) in the stroke Sc of FIG. 2B. Therefore, the laser beam becomes the P-polarized light with respect to the polarization beam splitter 15, and the laser beam substantially totally transmitted through the polarization beam splitter 15.

The laser beam transmitted through the polarization beam splitter 15 is reflected by the mirror 16 and formed in the parallel light by the collimator lens 17. Then, the laser beam is reflected by the mirror 18, and the laser beam is further reflected toward the HD objective lens 21 by the upwardly reflecting mirror 19. Then, the laser beam is converted into the circularly-polarized light by the quarter-wave plate 20, and the laser beam is caused to converge onto HD by the objective lens 21.

The laser beam reflected from HD is transmitted through the quarter-wave plate 20 again, thereby converting the laser beam into the linearly-polarized light orthogonal to the polarization direction in which the laser beam is incident to the optical disk. Then, the laser beam reversely travels the optical path, and is incident to the polarization beam splitter 15. At this point, the laser beam is substantially totally reflected by the polarization beam splitter 15 because the polarization direction of the laser beam becomes the S-polarized light with respect to the polarization beam splitter 15. Then, the anamorphic lens 27 induces the astigmatism into the laser beam, and the laser beam converges onto the light acceptance surface (quadratic sensor) of the photodetector 28.

In performing the reproduction operation to HD, the aberration servo signal is supplied to the motor 45, the collimator lens 17 is finely moved in the optical axis direction in the aberration correction stroke range (stroke Sc of FIG. 2B), which suppresses the aberration generated in the laser beam on HD.

Figure 6:
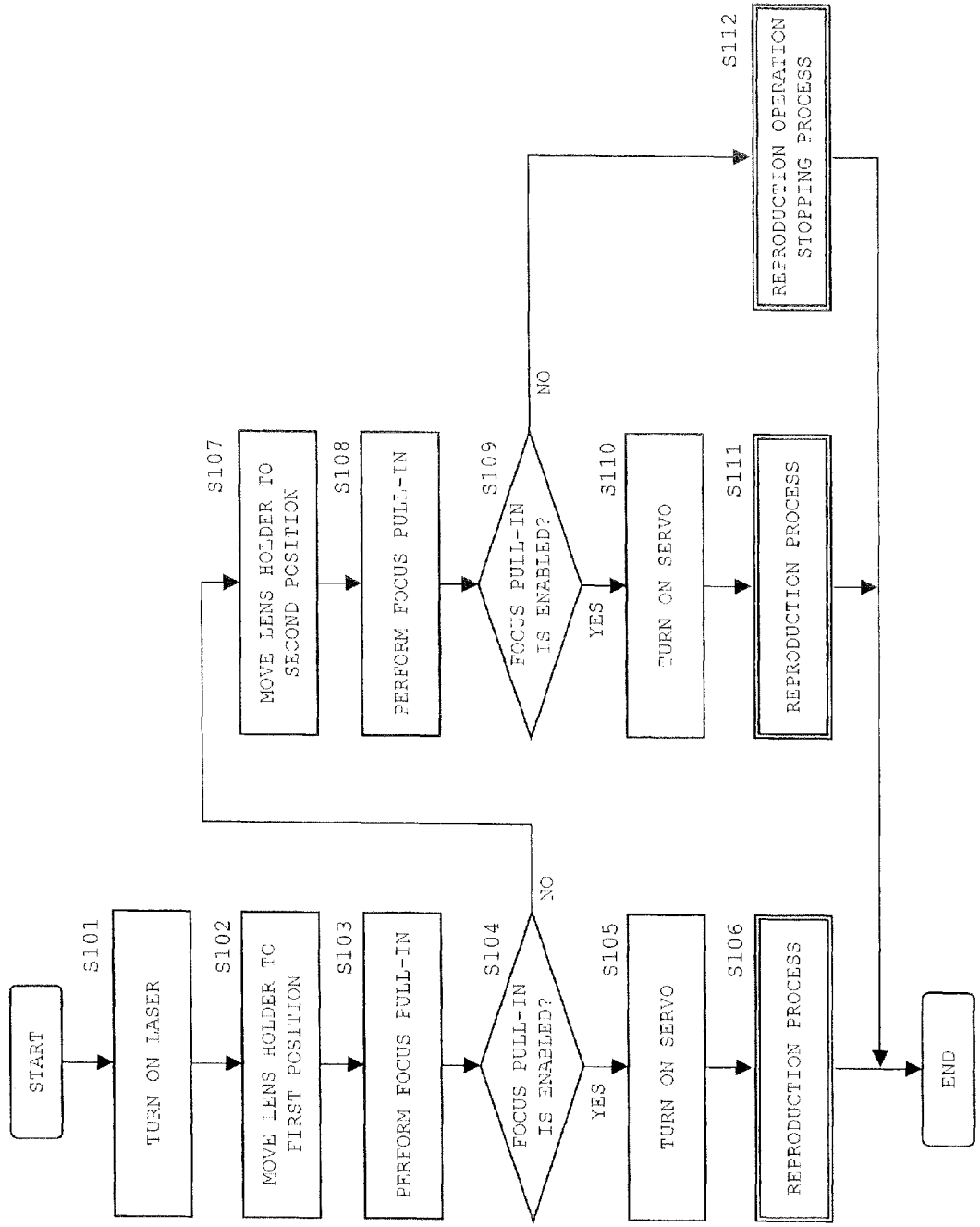
FIG. 6 is a flowchart showing a reproduction operation of the optical disk apparatus of the embodiment.

A reproduction operation of the optical disk apparatus will be described with reference to FIG. 6.

When the reproduction operation is started, the semiconductor laser 11 is turned on (S101), and the lens holder 41 is moved to the first position (S102). Therefore, the optical disk to be reproduced is irradiated with the laser beam through the BD objective lens 26. At this point, the collimator lens 22 is located at the initial position in the stroke Sa of FIG. 2A.

Then, the objective lens holder 31 is moved in the focus direction to try the focus pull-in of the laser beam to the optical disk to be reproduced (S103). In the case where BD is the optical disk to be reproduced, an S-shape curve having sufficient waveform amplitude appears on the focus error signal to enables the focus pull-in (YES in S104). In this case, the microcomputer 55 determines that BD is the optical disk to be reproduced, and the microcomputer 55 causes the servo circuit 53 to perform a BD servo process (S105). Therefore, the servo (focus servo and tracking servo) is applied to the BD objective lens 26, and the aberration servo is applied to the collimator lens 22. Then, the reproduction process is performed to the optical disk (S106).

On the other hand, when BD is not the optical disk to be reproduced, the S-shape curve having the sufficient waveform amplitude does not appear on the focus error signal due to the difference in cover layer, and the focus pull-in is not enabled (NO in S104). In this case, the microcomputer 55 determines that BD is not the optical disk to be reproduced, and the microcomputer 55 moves the lens holder 41 to the second position (S107). Therefore, the lens holder 46 is displaced against the biasing force of the spring 47, and the collimator lens 22 is located at the initial position of the stroke Sc of FIG. 2B, whereby the optical disk to be reproduced is irradiated with the laser beam through the HD objective lens 21.

Then, the microcomputer 55 re-tries the focus pull-in of the laser beam to the optical disk to be reproduced (S108). When HD is the optical disk to be reproduced, the S-shape curve having the sufficient waveform amplitude appears on the focus error signal to enables the focus pull-in (YES in S109). In this case, the microcomputer 55 determines that HD is the optical disk to be reproduced, and the microcomputer 55 causes the servo circuit 53 to perform a HD servo process (S110). Therefore, the servo (focus servo and tracking servo) is applied to the HD objective lens 21, and the aberration servo is applied to the collimator lens 17. Then, the reproduction process is performed to the optical disk (S111).

When the S-shape curve having the sufficient waveform amplitude does not appear on the focus error signal in the focus pull-in in Step S108, the microcomputer 55 determines that neither BD nor HD is the optical disk to be reproduced, and the microcomputer 55 stops the reproduction operation to the optical disk (S112). In this case, a user is informed of a disk error by ejecting the optical disk or by displaying error display on a monitor.

Thus, according to the embodiment, the half-wave plates 13 and 14 are inserted in and retracted from the optical path using the actuator driving the collimator lens 22, and the target to which the laser beam is incident is switched between the BD objective lens 26 and the HD objective lens 21. Therefore, the need for the additional configuration for driving the half-wave plate is eliminated to achieve the simple configuration of the optical pickup device. Because the inexpensive half-wave plates 13 and 14 are used as the optical path switching function, the cost increase can be suppressed in the optical pickup device. Because the optical paths are switched only by controlling the drive of the motor 45, the circuit configuration and the control process become simplified on the optical disk apparatus side.

Additionally, according to the embodiment, the gaps are provided between the supported portion 41c and the supported portions 46a and 46b shown in FIGS. 2A and 2B, which allows the drive stroke of the lens holder 46 to be suppressed and to shorten the optical path between the mirrors 16 and 18. Therefore, even if the large optical path is not ensured between the mirrors 16 and 18 due to the layout of the optical components, according to the embodiment, the collimator lens 17 can smoothly be driven by the common motor 45.

Accordingly, the embodiment provides the optical pickup device which can smoothly sort the laser beam into the two objective lenses 21 and 26 with the simple configuration and the optical disk apparatus into which the optical pickup device is incorporated.

The present invention is not limited to the embodiment, but various modifications can be made.

Figure 7B:
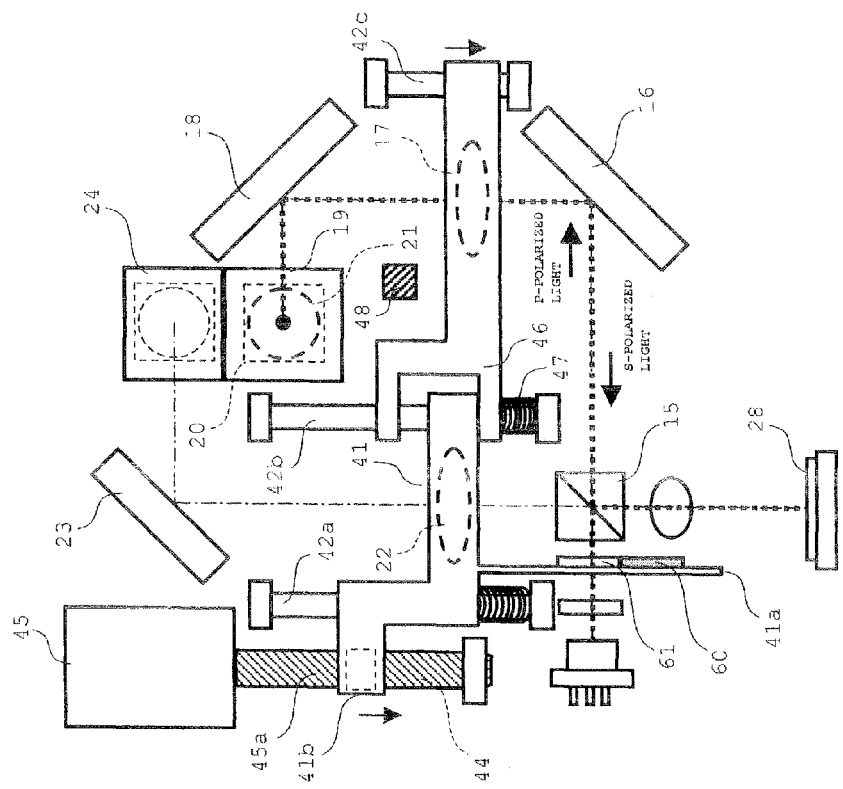
FIGS. 7A and 7B show a modification of the optical pickup device of the embodiment.
Figure 7A:
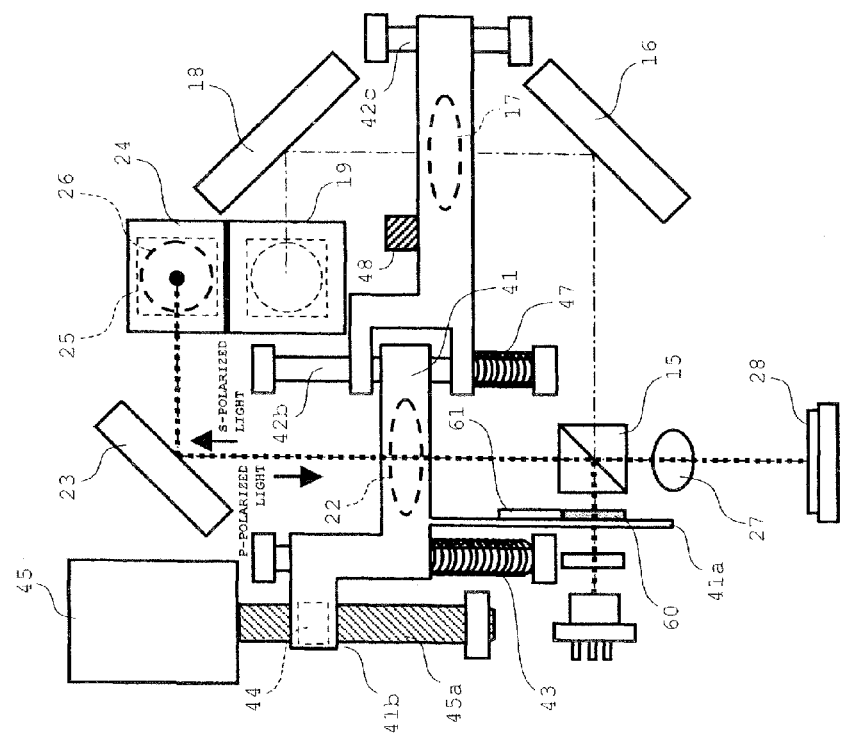

In the embodiment, the polarization direction of the laser beam is switched between the P-polarized light and the S-polarized light with respect to the polarization beam splitter 15 using the two half-wave plates 13 and 14. Alternatively, as shown in FIGS. 7A and 7B, the polarization direction of the laser beam may be switched between the P-polarized light and the S-polarized light with respect to the polarization beam splitter 15 using one half-wave plate 60. In this case, the polarization direction of the laser beam transmitted through the half-wave plate 12 is adjusted so as to become the P-polarized light with respect to the polarization beam splitter 15. The half-wave plate 60 is adjusted such that the polarization direction of the laser beam transmitted through the half-wave plate 60 becomes the S-polarized light.

In the configuration shown in FIGS. 7A and 7B, the transparent plate 61 is inserted in the optical path when the lens holder 41 is moved to the second position. Alternatively, even if the laser beam passes through the simple space without particularly providing the transparent plate 61, the polarization direction of the laser beam may be switched between the P-polarized light and the S-polarized light only by inserting and retracting the half-wave plate 60 in and from the optical path. However, in the case of the simple space, a difference in optical path length is generated between the laser beam passing through the half-wave plate 60 and the laser beam passing through the space, and the resultant convergent positions of both the laser beams are shifted backward and forward on the light acceptance surface of the photodetector 28. Therefore, both the laser beams are hardly accepted by the one light acceptance surface.

In the configuration shown in FIGS. 7A and 7B, a transparent plate 61 is provided to solve such disadvantages. The transparent plate 61 has a thickness such that the laser beam becomes the same optical path length as the case in which the laser beam passes through the half-wave plate 60. The provision of the transparent plate 61 eliminates the difference in optical path length between the case in which the laser beam is transmitted through the half-wave plate 60 and the case in which the laser beam passes through the transparent plate 61, so that the convergent position of both the laser beams can be matched with each other on the light acceptance surface of the photodetector 28. Therefore, both the laser beams can smoothly be accepted on the common light acceptance surface.

Figure 8A:
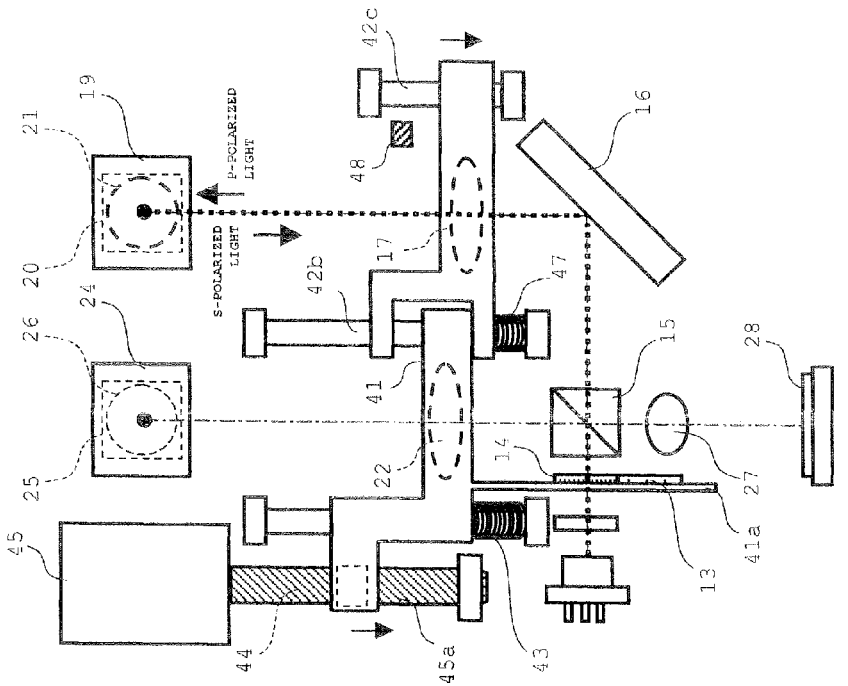
FIGS. 8A and 8B show a modification of the optical pickup device of the embodiment.
Figure 8B:
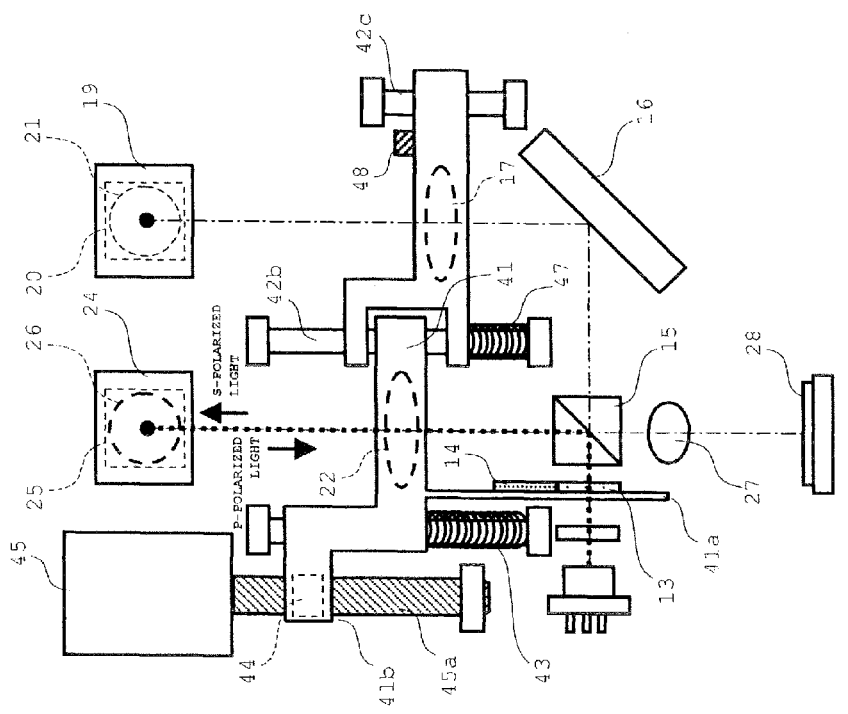

Additionally, the HD objective lens 21 and the BD objective lens 26 may be disposed as shown in FIGS. 8A and 8B. In this case, the mirrors 18 and 23 of FIGS. 1A and 1B can be omitted to achieve the simple configuration and the reduced number of components.

Figure 9:
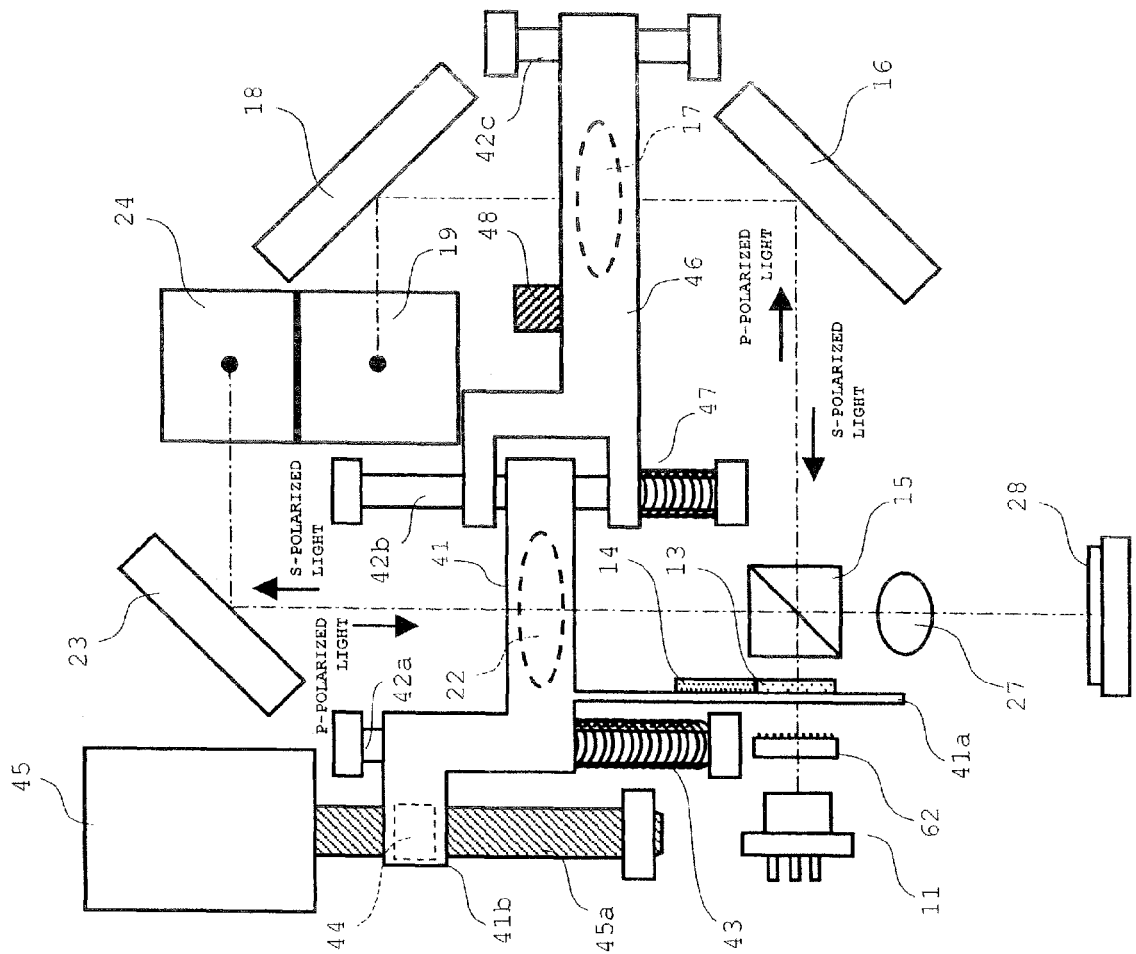
FIG. 9 shows a modification of the optical pickup device of the embodiment.

In the embodiment, the tracking error signal (TE) is generated by the one-beam push pull. In the case where the optical disk apparatus can record the data in the optical disk, the tracking error signal can also be generated by a DPP (Deferential Push Pull) method in which the three beams are used. In this case, as shown in FIG. 9, the half-wave plate 12 of FIGS. 1A and 1B is replaced by a half-wave plate 62 in which a three-beam diffraction grating in the surface thereof. The half-wave plate 62 has both a function of adjusting the polarization direction of the laser beam in the direction shown in FIG. 1C and a function of dividing the laser beam from the semiconductor laser 11 into three beams by diffraction.

Because BD differs from HD in a track pitch, an in-line pattern is applied to a pattern of the three-beam diffraction grating. Therefore, the light reflected from the optical disk can be accepted by the common light acceptance surface regardless of whether the optical disk to be reproduced is BD or HD. Because the in-line DPP method is well-known technique the description is omitted.

Figure 10:
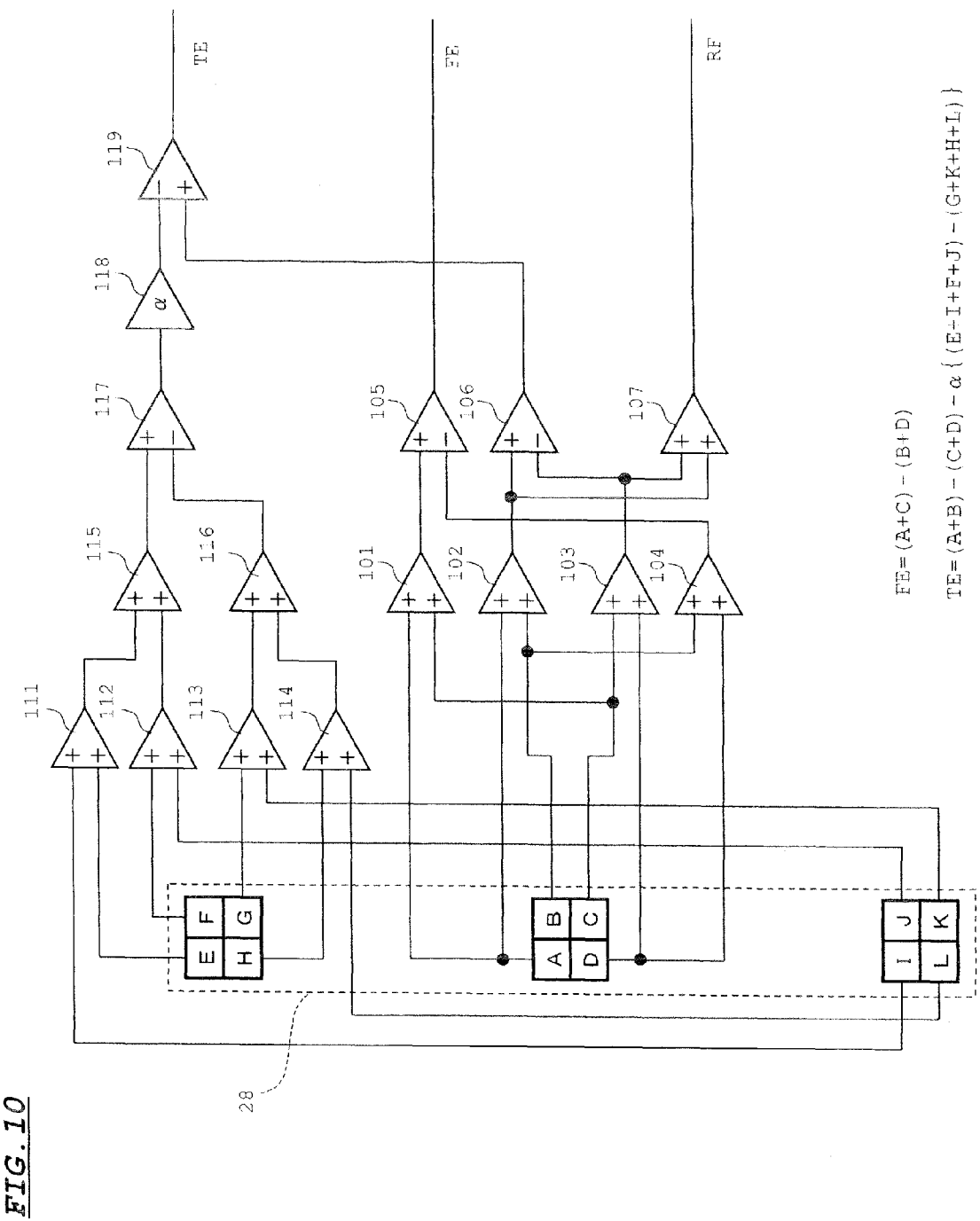
FIG. 10 shows a modification of the signal amplifying circuit of the embodiment.

FIG. 10 shows a configuration of the signal amplifying circuit 51 in which the DPP method is adopted. Adding circuits 111 to 116, subtracting circuits 117 and 119, and a multiplication circuit 118 are added compared with the case of FIG. 4. Quadratic sensors E to G and I to L are added to the photodetector 28 to accept sub-beams.

Assuming that A to L are signals outputted from the quadratic sensors A to L, the tracking error signal (TE) is generated by the computation of TE=(A+B)−(C+D)−α{(E+I+F+J)−(G+K+H+L)}. The focus error signal (FE) and the reproduction signal (RF) are generated in the same way as the embodiment.

Figure 11:
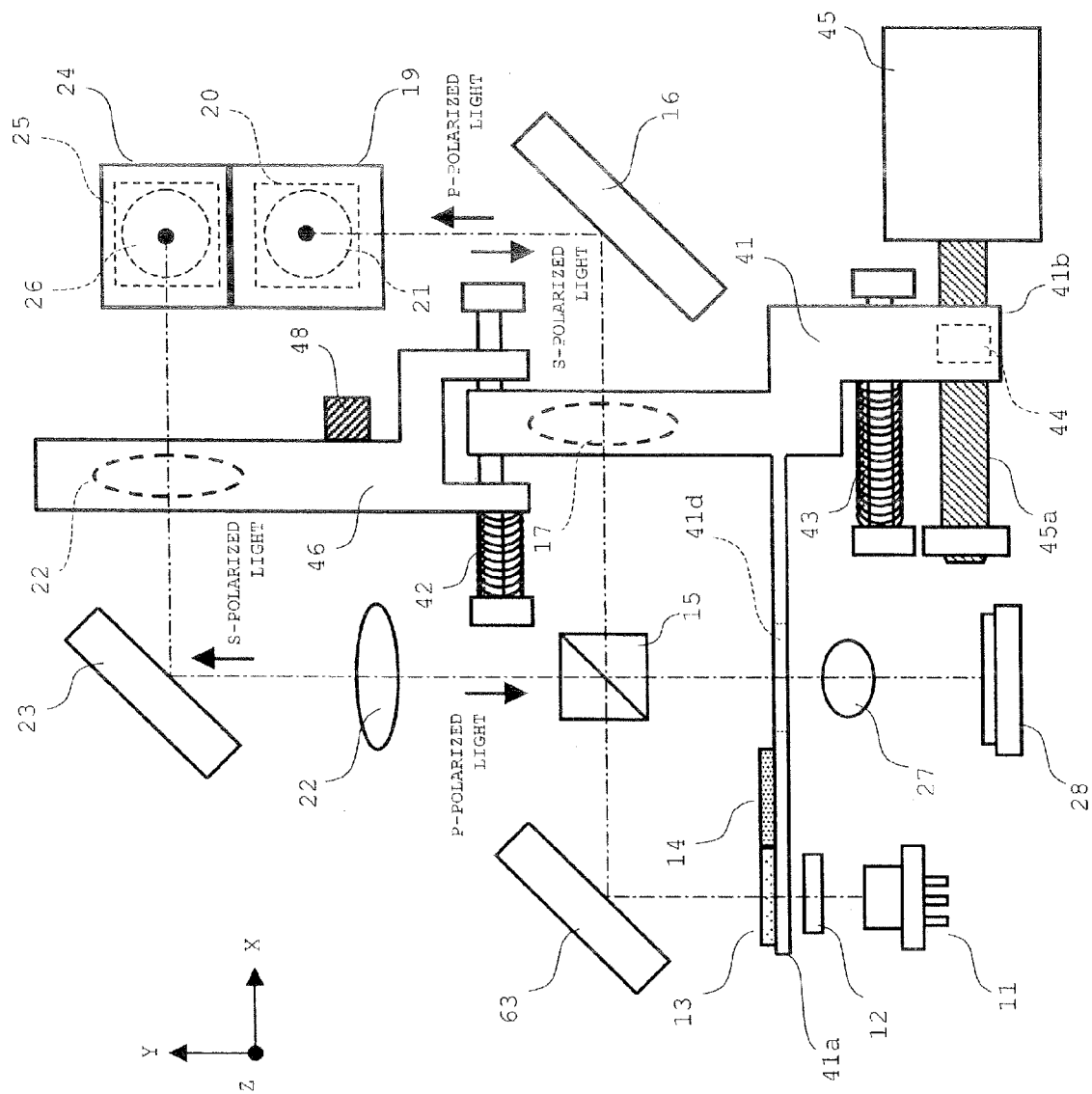
FIG. 11 shows a modification of the optical pickup device of the embodiment.

In the embodiment, the half-wave plates 13 and 14 are moved in the same direction as the optical axis of the laser beam reflected by the polarization beam splitter 15. Alternatively, as shown in FIG. 11, the half-wave plates 13 and 14 may be moved in the same direction as the optical axis of the laser beam transmitted through the polarization beam splitter 15. In this case, the collimator lenses 17 and 22 are displaced in the X-axis direction to suppress the aberration generated in the laser beam. An opening 41d is formed in the tongue piece 41a of the lens holder 41 so as not to obstruct the laser beam traveling from the polarization beam splitter 15 to the anamorphic lens 27. As shown in FIG. 11, the arrangement of the semiconductor laser 11 and the half-wave plate 12 is changed, and a mirror 63 is added to guide the laser beam transmitted through the half-wave plate 13 or 14 to the polarization beam splitter 15.

In the embodiment, the present invention is applied to the optical pickup device compatible with BD and HD and the optical disk apparatus into which the optical pickup device is incorporated. The present invention can also be applied to other compatible optical pickup devices as appropriate. In the above description, the optical path switching wave plate is provided in the actuator displacing the collimator lens. Alternatively, the optical path switching wave plate may be provided in the actuator displacing other optical elements such as an expander lens. In the embodiment, the polarization direction of the laser beam is adjusted using the half-wave plate 12. Alternatively, the polarization direction of the laser beam may be adjusted by rotating the semiconductor laser 11 about the optical axis.

Various changes and modifications can be made without departing from the scope of the present invention.

What is claimed is:

1. An optical pickup device comprising:
   a laser source which emits a laser beam having a predetermined wavelength;
   first and second objective lenses which cause the laser beam to converge onto a recording medium;
   a polarization beam splitter which is disposed between the laser source and the first and second objective lenses;

first and second optical systems which guide the two laser beams split by the polarization beam splitter to the first and second objective lenses respectively;

first and second optical elements which are disposed in the first and second optical systems respectively, the first and second optical elements being moved in optical axis directions of the laser beams to adjust optical characteristics of the laser beams respectively;

a first actuator which supports a first holder holding the first optical element while the first holder can be displaced in the optical axis direction of the laser beam;

a second actuator which supports a second holder holding the second optical element while the second holder can be displaced in the optical axis direction of the laser beam;

a driving portion which imparts a driving force to the first actuator;

a transfer mechanism which transfers the driving force to the second actuator such that a drive stroke is smaller than that of the first actuator; and a wave plate which is inserted in and retracted from an optical path between the laser source and the polarization beam splitter to change the polarization direction of the laser beam incident to the polarization beam splitter, wherein the first and second optical elements are moved in a direction in which the wave plate is inserted and retracted, the wave plate is disposed in a support portion integral with the first holder, the first actuator moves the first holder in both a first stroke for optical characteristic adjustment with the first optical element and a second stroke exceeding the first stroke, the first holder is moved between the first stroke and the second stroke to insert and retract the wave plate in and from the optical path, the polarization direction of the laser beam incident to the polarization beam splitter is adjusted such that the laser beam is guided to the first optical system, when the first holder is located in the first stroke, and the second holder is located in the stroke for optical characteristic adjustment with the second optical element while the polarization direction of the laser beam incident to the polarization beam splitter is adjusted such that the laser beam is guided to the second optical system, when the first holder is located in the second stroke.

2. The optical pickup device according to claim 1, wherein the first and second optical elements are lenses for correcting aberration generated in the laser beam.

3. The optical pickup device according to claim 1, wherein the wave plate includes first and second wave plate regions where the laser beam is formed in P-polarized light and S-polarized light with respect to the polarization beam splitter, and a target inserted in the optical path is switched between the first and second wave plate regions based on whether the first holder is located in the first stroke or the second stroke.

4. The optical pickup device according to claim 1, wherein the polarization direction of the laser beam becomes P-polarized light or S-polarized light with respect to the polarization beam splitter before being incident to the wave plate, the wave plate includes a wave plate region where the polarization direction of the laser beam is rotated by about 90° and a transparent plate region having a thickness of an optical path length identical to that of the wave plate region, and a target inserted in the optical path is switched between the wave plate region and the transparent plate region based on whether the first holder is located in the first stroke or the second stroke.

5. An optical disk apparatus comprising:

an optical pickup device; and a servo circuit which controls the optical pickup device, wherein the optical pickup device including:

a laser source which emits a laser beam having a predetermined wavelength;

first and second objective lenses which cause the laser beam to converge onto a recording medium;

a polarization beam splitter which is disposed between the laser source and the first and second objective lenses, first and second optical systems which guide the two laser beams split by the polarization beam splitter to the first and second objective lenses respectively;

first and second optical elements which are disposed in the first and second optical systems respectively, the first and second optical elements being moved in optical axis directions of the laser beams to adjust optical characteristics of the laser beams respectively;

a first actuator which supports a first holder holding the first optical element while the first holder can be displaced in the optical axis direction of the laser beam;

a second actuator which supports a second holder holding the second optical element while the second holder can be displaced in the optical axis direction of the laser beam;

a driving portion which imparts a driving force to the first actuator;

a transfer mechanism which transfers the driving force to the second actuator such that a drive stroke is smaller than that of the first actuator; and a wave plate which is inserted in and retracted from an optical path between the laser source and the polarization beam splitter to change the polarization direction of the laser beam incident to the polarization beam splitter, wherein the first and second optical elements are moved in a direction in which the wave plate is inserted and retracted, the wave plate is disposed in a support portion integral with the first holder, the first actuator moves the first holder in both a first stroke for optical characteristic adjustment with the first optical element and a second stroke exceeding the first stroke, the first holder is moved between the first stroke and the second stroke to insert and retract the wave plate in and from the optical path, the polarization direction of the laser beam incident to the polarization beam splitter is adjusted such that the laser beam is guided to the first optical system, when the first holder is located in the first stroke, and the second holder is located in the stroke for optical characteristic adjustment with the second optical element while the polarization direction of the laser beam incident to the polarization beam splitter is adjusted such that the laser beam is guided to the second optical system, when the first holder is located in the second stroke, and wherein the servo circuit controls the driving portion to adjust the optical characteristics of the laser beams incident to the first and second objective lenses, and the servo circuit controls whether the laser beam is guided to the first or second optical system.

6. The optical disk apparatus according to claim 5, wherein the first and second optical elements are lenses for correcting aberration generated in the laser beam.

7. The optical disk apparatus according to claim 5, wherein the wave plate includes first and second wave plate regions where the laser beam is formed in P-polarized light and S-polarized light with respect to the polarization beam splitter, and
    a target inserted in the optical path is switched between the first and second wave plate regions based on whether the first holder is located in the first stroke or the second stroke.

8. The optical disk apparatus according to claim 5, wherein the polarization direction of the laser beam becomes P-polarized light or S-polarized light with respect to the polarization beam splitter before being incident to the wave plate,
    the wave plate includes a wave plate region where the polarization direction of the laser beam is rotated by about 90° and a transparent plate region having a thickness of an optical path length identical to that of the wave plate region, and
    a target inserted in the optical path is switched between the wave plate region and the transparent plate region based on whether the first holder is located in the first stroke or the second stroke.

* * * * *